United States Patent
Clemen, Jr.

(10) Patent No.: US 9,689,956 B2
(45) Date of Patent: Jun. 27, 2017

(54) SYSTEMS AND METHODS FOR DETECTING LIGHT

(71) Applicant: THE BOEING COMPANY, Chicago, IL (US)

(72) Inventor: Mark Joseph Clemen, Jr., Seattle, WA (US)

(73) Assignee: The Boeing Company, Chicago, IL (US)

( * ) Notice: Subject to any disclaimer, the term of this patent is extended or adjusted under 35 U.S.C. 154(b) by 175 days.

(21) Appl. No.: 14/643,386

(22) Filed: Mar. 10, 2015

(65) Prior Publication Data

US 2016/0266228 A1    Sep. 15, 2016

(51) Int. Cl.
| G01J 1/00 | (2006.01) |
| G01S 3/782 | (2006.01) |
| G01J 1/42 | (2006.01) |
| G01S 3/784 | (2006.01) |

(52) U.S. Cl.
CPC ............ *G01S 3/782* (2013.01); *G01J 1/4228* (2013.01); *G01J 1/4257* (2013.01); *G01S 3/784* (2013.01)

(58) Field of Classification Search
CPC ....... G01J 1/4228; G01J 1/4257; G01S 3/782; G01S 3/784
USPC ........................................................ 356/121
See application file for complete search history.

(56) References Cited

U.S. PATENT DOCUMENTS

| 2012/0059254 A1* | 3/2012 | Lifan ..................... A61B 1/043 600/431 |
| 2012/0224804 A1* | 9/2012 | Hashimoto .......... G02B 6/4214 385/14 |
| 2014/0336479 A1* | 11/2014 | Ando ................... A61B 5/4041 600/310 |

OTHER PUBLICATIONS

Hornbeck, Larry J., "Digital Light Processing and MEMS: An Overview," published in Advanced Applications of Lasers in Materials Processing/Broadband Optical Networks, Smart Pixels/Optical MEMS and Their Application, IEEE/LEOS 1996.

* cited by examiner

*Primary Examiner* — Sunghee Y Gray
(74) *Attorney, Agent, or Firm* — Joseph M. Butscher; The Small Patent Law Group, LLC

(57) ABSTRACT

A light detection system may include a light detecting assembly including a plurality of light detectors. Each light detector may include a substrate, a mirror coupled to the substrate, and a light-receiving tube coupled to the substrate. The light-receiving tube may include a sensor positioned at a first end, a light-transmissive opening at a second end that is opposite from the first end, and a plurality of partitions that are configured to block transmission of light energy. A central light path extends through the light-receiving tube. The system may also include a control unit in communication with the light detecting assembly. The control unit is configured to determine one or more of a direction of light emitted from a light source, a position of the light source, or an intensity of light emitted from the light source based on one or more light detection signals received from the light detecting assembly.

19 Claims, 9 Drawing Sheets

SYSTEMS AND METHODS FOR DETECTING LIGHT

FIELD OF EMBODIMENTS OF THE DISCLOSURE

Embodiments of the present disclosure generally relate to systems and methods for detecting emitted light, and, more particularly, to systems and methods for detecting a direction from which light is emitted, a location of a light source, and/or an intensity of such light.

BACKGROUND OF THE DISCLOSURE

Optical systems are used in various applications. For example, optical systems may be used in conjunction with various weapons systems to guide ordnance to a particular target. Also, light energy itself may be used as a weapon, such as a high-powered laser. Accordingly, identifying an origin of light energy may provide information as to the location of an enemy combatant.

Also, in commercial flight, determining an origin of light energy may be useful. As an example, individuals using laser pointers have attempted to distract pilots by directing laser energy into or otherwise toward a cockpit as an aircraft is taking off or landing. By identifying a source of the light energy, a location of a perpetrator may be discovered, and authorities may be alerted to the location.

Various light detection devices are known. One type of light detection device includes a charge coupled device (CCD) or complementary metal oxide semiconductor (CMOS) apparatus that is spaced apart from a lens, which is used to focus light energy onto a surface of the CCD or CMOS apparatus. However, the use of lenses and separation distances adds weight, size, and cost to the light detection devices.

Thus, a need exists for an efficient and cost effective light detection device. Further, a need exists for a sensitive and durable light detection device.

SUMMARY OF THE DISCLOSURE

Certain embodiments of the present disclosure provide a light detecting assembly that may include one or more light detectors, each of which may include a substrate, a mirror coupled to the substrate, and a light-receiving tube coupled to the substrate. The light-receiving tube may include a sensor positioned at a first end, a light-transmissive opening at a second end that is opposite from the first end, and a plurality of partitions that are configured to block transmission of light energy. A central light path extends through the light-receiving tube. In at least one embodiment, the light detecting assembly includes a plurality of light detectors.

The partitions may not extend into the central light path. Instead, aligned partitions may include internally-directed protuberances having openings therebetween (for example, the space that separates vertically aligned partitions). The openings of each partition may be linearly aligned with one another. The central light path extends through the openings.

The mirror is configured to reflect light from a light source into the light-transmissive opening of the light-receiving tube. The mirror may be positioned relative to a particular location. The mirror may be oriented at a unique angle that is configured to reflect light from a light source that is at the particular location onto the sensor. In contrast, the light is reflected into at least one partition when the light source is at a different location other than the particular location. Each of the partitions may be configured to prevent light that passes into the light-receiving tube from reflecting out of the light-receiving tube.

In at least one embodiment, the mirror may be fixed in position relative to the substrate and the light-receiving tube. In at least one other embodiment, each of the light detectors may include at least one actuator operatively coupled to the mirror. The actuator(s) is configured to move the mirror relative to the substrate and the light-receiving tube.

At least portions of the substrate and the light-receiving tube (such as external portions that are exposed to an environment) may be covered with a reflective layer. The reflective layer reflects light energy that impinges thereon, which protects the light detecting assembly from damage, such as caused by excessive temperatures.

Certain embodiments of the present disclosure provide a light detection system that may include a light detecting assembly including a plurality of light detectors, such as described above. The light detection system may also include a control unit in communication with the light detecting assembly. The control unit is configured to determine (1) a direction of light emitted from a light source, (2) a position of the light source, and/or (3) an intensity of light emitted from the light source based on one or more light detection signals received from the light detecting assembly.

DETAILED DESCRIPTION OF THE DISCLOSURE

Figure 1:
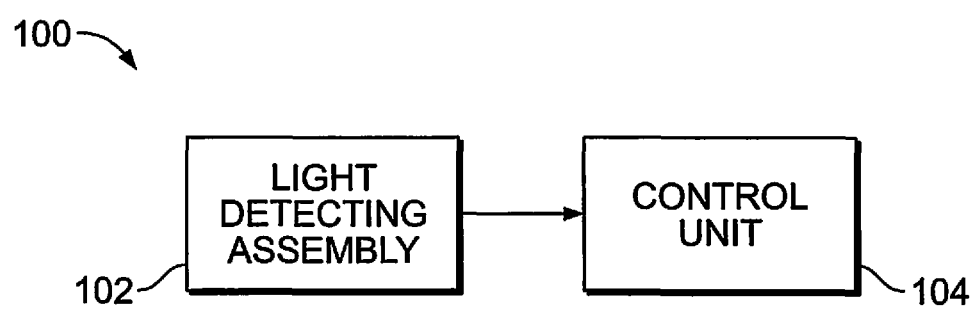
FIG. 1 illustrates a schematic block diagram of a light detection system, according to an embodiment of the present disclosure.

The foregoing summary, as well as the following detailed description of certain embodiments will be better understood when read in conjunction with the appended drawings. As used herein, an element or step recited in the singular and preceded by the word "a" or "an" should be understood as not necessarily excluding the plural of the elements or steps. Further, references to "one embodiment" are not intended to be interpreted as excluding the existence of additional embodiments that also incorporate the recited features. Moreover, unless explicitly stated to the contrary, embodiments "comprising" or "having" an element or a plurality of elements having a particular property may include additional elements not having that property.

Certain embodiments of the present disclosure provide a compact light detection system that is used to sense a direction of emitted light from an optical source, such as a laser, infrared source, visible light source, ultraviolet source, and/or the like. The light detection system is configured to detect a direction and/or intensity of emitted light over a wide coverage area.

Embodiments of the present disclosure may provide a relatively flat light detecting assembly that may be implemented in or on a vehicle, a handheld device, a fixed structure, and/or the like. The light detecting assembly may include one or more light detectors. For example, the light detecting assembly may include a single light detector that may be moveable over one or more ranges of motion. In at least one embodiment, the light detecting assembly may include a plurality of light detectors, such as light detecting unit cells, each of which may be fixed in position or moveable over a range of angles. Each light detector may be various shapes and sizes. For example, a single light detector may have a length of one meter (1 m), a width of one meter, and a depth of one meter. Alternatively, each of the length, width, and depth may be greater or lesser than one meter. In another embodiment, each light detector may have a length of 200 microns (200µ), a width of 20 microns, and a depth of 10 microns. Alternatively, each of the length, width, and depth may be greater or lesser than 200 microns, 20 microns, and 10 microns, respectively.

In at least one embodiment, each light detecting assembly may include one or more light detectors, each of which may include a fixed angle mirror and a light-receiving tube. The mirror and light-receiving tube are used to determine a location of a light source. For example, the mirror may reflect light into the light-receiving tube toward a sensor, such as a photodiode or phototransistor.

The light detecting assembly may include a plurality of light detectors. Each mirror of each light detector may be positioned at a different angle. When light energy is aimed toward the light detecting assembly, the mirrors reflect the light energy into a respective partition and toward a respective sensor. A single mirror may be at an angle of incidence at which the mirror reflects the light energy towards a respective sensor. Based on the knowledge of which sensor received the light energy, the position of the origin of the light energy may be determined, such as through a control unit. As the light detecting assembly moves, the origin of the light source may be geo-located. The light-receiving tube may be configured to prevent light from the mirror from being reflected back to another mirror and causing inaccurate readings.

Certain embodiments of the present disclosure provide a light source detection system that may include at least one tube having a sensor at one end and a light-transmissive opening at an opposite end. The system may also include a plurality of partitions each having an opening therein. The partitions may be disposed within the tube and arranged in a spaced-apart manner with the openings in each partition being linearly aligned along an axis to define a central light path, such that only light that is substantially aligned with the central light path is able to pass through the openings in the plurality of partitions to the sensor. The system may also include a controller for controllably orienting at least one mirror to a position at which light from a target light source is reflected by the mirror(s) at an angle of incidence such that light from the source is generally aligned with the central light path and impinges on the sensor. The location of the target light source may be determined based on the orientation of the mirror(s) when oriented to reflect light from the light source to the sensor.

The central light path may extend into a surface of the sensor. For example, the central light path may extend into and through a plane of a detecting surface of the sensor, which may allow for a more compact system. In at least one embodiment, instead of a central light path that is wholly aligned with a single axis or plane, one or more re-directing mirrors may be used to provide one or more twists, bends, turns, or the like in the central light path. For example, the light-receiving tube may include an angled mirror therein that angles the central light path at a ninety degree angle, for example. The angled or canted light path may be used to provide a more compact light-receiving tube.

The plurality of partitions may include a material configured to block the transmission of off-axis light through the partitions to the sensor. The sides of the plurality of partitions facing the sensor may be configured to prevent light reflected by the at least one mirror from being reflected back towards the at least one mirror.

Each mirror may be operatively connected to a micro-electrical-mechanical system (MEMS). The MEMS may be configured to move the mirror over a range of motion. For example, a mirror may be connected to a yoke, which is in turn connected to one or more torsion hinges, which, in turn, connect to one or more posts secured to a substrate and/or an actuator.

FIG. 1 illustrates a schematic block diagram of a light detection system 100, according to an embodiment of the present disclosure. The light detection system 100 includes a light detecting assembly 102 operatively coupled to a controller, such as a monitoring or control unit 104. The light detecting assembly 102 may be connected to the control unit 104 through a wired or wireless connection. For example, one or more sensors (such as one or more phototransistors and/or one or more photodiodes) may be operatively connected to the control unit through one or more wired or wireless connections. The light detecting assembly 102 and the control unit 104 may be contained within a single housing. Alternatively, the control unit 104 may be remotely located from the light detecting assembly 102.

As explained below, the light detecting assembly 102 may include one or more light detectors. Each light detector may include a substrate that supports a light-receiving tube having a light-transmissive opening at one end, and a sensor at an opposite end, and partitions therebetween. A mirror may be spaced apart from the light-transmissive opening. The mirror is configured to receive incident light energy and reflect the light energy. The mirror may reflect the light energy into the light-transmissive opening toward the sensor. Partitions within the light-receiving tube may block the reflected light energy from impinging upon the sensor if the reflected light energy is not aligned with or otherwise parallel to a central light path, which extends through the partitions and is substantially aligned with or otherwise parallel to a central longitudinal axis of the central light path in the light-receiving tube. When light energy reflected from the mirror passes through the light-receiving tube without impinging on any of the partitions, the light energy reaches the sensor, which outputs a changing signal indicating that light energy has been sensed. The control unit 104 receives the signal from the sensor and determines that the sensed light energy is directed on a path that is associated with the position of the mirror on the substrate. For example, by analyzing the signal received from the sensor, the control unit is able to determine the angle of reflectance off the mirror (or the mirror orientation) and therefore detect that the light energy is emanating from a direction that is along a line of incidence that is angled with respect to a line of reflectance from the mirror to the sensor by the angle of reflectance. Thus, the relative direction of the light energy source may be determined based on the angle of reflectance (or mirror orientation) when the sensor outputs a signal indicating the detection of light energy passing through the central light path.

The control unit 104 may output a light detection readout or signal that may be asynchronous (for example, continually cycling), or may be synchronous with an external trigger. For example, the external trigger may be detection of light energy at or above a particular intensity, wavelength, and/or the like.

The control unit 104 may also be configured to detect an intensity of light energy sensed by the sensor. In at least one embodiment, the control unit 104 may disregard output signals from the sensors that are below a predetermined threshold. For example, the predetermined threshold may be a threshold energy level of laser light energy. In at least one embodiment, the control unit 104 may be configured to determine a wavelength of light energy that impinges on the sensor. For example, the sensor may be configured to detect one or more of infrared light, visible light, ultraviolet light, and/or the like. In at least one embodiment, the light detecting assembly 102 may include a plurality of light detectors. Different light detectors or groups of light detectors may be configured to detect light of different wavelengths.

The light detecting assembly 102 may include a plurality of light detectors having fixed mirrors. Each of the fixed mirrors may be oriented at a different angle. In at least one other embodiment, each light detector may include or otherwise be operatively coupled to an actuator that is configured to move the light detector and/or the mirror over a range of positions.

The controller or control unit 104 may be or include one or more central processing units (CPUs), which may be in communication with or otherwise include, a memory that stores programs, instructions, and the like that govern operation of the transducer. In short, the control unit 104 may be or include one or more circuits that include one or more processors (such as microprocessors, microcontrollers, etc.), one or more memories, and/or the like that are configured to control the position determination of the system 100.

As used herein, the term "controller," "control unit," "central processing unit," "CPU," "computer," or the like may include any processor-based or microprocessor-based system including systems using microcontrollers, reduced instruction set computers (RISC), application specific integrated circuits (ASICs), logic circuits, and any other circuit or processor capable of executing the functions described herein. Such are exemplary only, and are thus not intended to limit in any way the definition and/or meaning of such terms.

The computer or processor executes a set of instructions that are stored in one or more storage elements (such as one or more memories), in order to process data. The storage elements may also store data or other information as desired or needed. The storage element may be in the form of an information source or a physical memory element within a processing machine.

The set of instructions may include various commands that instruct the computer or processor as a processing machine to perform specific operations such as the methods and processes of the various embodiments of the subject matter described herein. The set of instructions may be in the form of a software program. The software may be in various forms such as system software or application software. Further, the software may be in the form of a collection of separate programs or modules, a program module within a larger program or a portion of a program module. The software also may include modular programming in the form of object-oriented programming. The processing of input data by the processing machine may be in response to user commands, or in response to results of previous processing, or in response to a request made by another processing machine.

The diagrams of embodiments herein may illustrate one or more control or processing units (such as the control unit 104) or modules. It is to be understood that the processing or control units or modules represent circuit modules that may be implemented as hardware with associated instructions (e.g., software stored on a tangible and non-transitory computer readable storage medium, such as a computer hard drive, ROM, RAM, or the like) that perform the operations described herein. The hardware may include state machine circuitry hardwired to perform the functions described herein. Optionally, the hardware may include electronic circuits that include and/or are connected to one or more logic-based devices, such as microprocessors, processors, controllers, or the like. Optionally, the control units or modules may represent processing circuitry such as one or more of a field programmable gate array (FPGA), application specific integrated circuit (ASIC), microprocessor(s), a quantum computing device, and/or the like. The circuits in various embodiments may be configured to execute one or more algorithms to perform functions described herein. The one or more algorithms may include aspects of embodiments disclosed herein, whether or not expressly identified in a flowchart or a method.

As used herein, the terms "software" and "firmware" are interchangeable, and include any computer program stored in memory for execution by a computer, including RAM memory, ROM memory, EPROM memory, EEPROM memory, and non-volatile RAM (NVRAM) memory. The above memory types are exemplary only, and are thus not limiting as to the types of memory usable for storage of a computer program.

Figure 2:
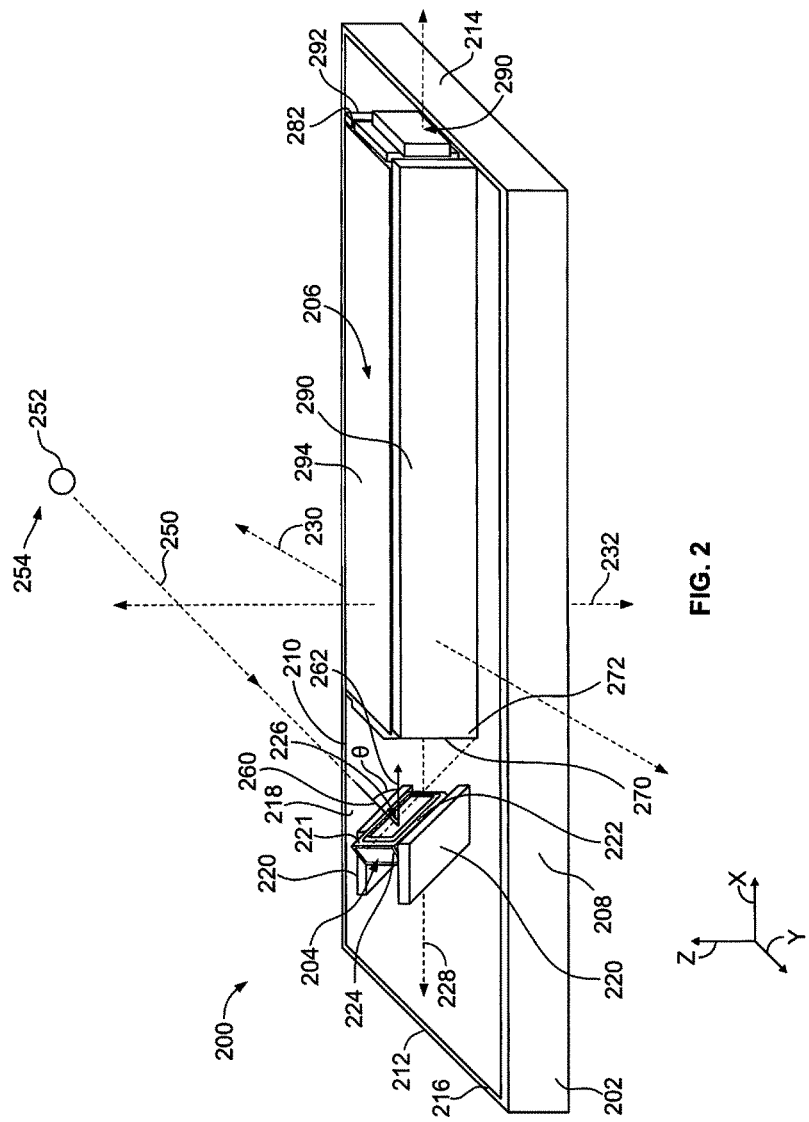
FIG. 2 illustrates a perspective top view of a light detector, according to an embodiment of the present disclosure.

FIG. 2 illustrates a perspective top view of a light detector 200, according to an embodiment of the present disclosure. The light detector 200 may be part of a light detector assembly, such as the light detector assembly 102 of FIG. 1. For example, the light detector assembly 102 may include a plurality of light detectors 200. Alternatively, the light detector assembly 102 may be, or otherwise include, a single light detector 200.

The light detector 200 may include a substrate 202 that supports a mirror 204 and a light-receiving tube 206 having a plurality of partitions 298, such as inwardly-directed protuberances. The light-receiving tube 206 may be shaped as a rectangular box having linear surfaces. Optionally, the light-receiving tube 206 may be shaped as various other shapes, such as a cylinder. The substrate 202 may be formed of a rigid material. For example, the substrate 202 may be formed of silicon. Alternatively, the substrate 202 may be formed of various other materials, such as metals (for example, aluminum), plastics, or the like.

The substrate 202 may be a planar material having opposed sides 208, 210 connected to opposed ends 212, 214. A top surface 216 may extend between upper edges of the sides 208, 210, and the ends 212, 214. The top surface 216 may be flat. The top surface 216 may be, or otherwise support, a reflective layer 218, such as a mirror, aluminized sheet, and/or the like. The reflective layer 218 is configured to reflect light energy, instead of absorbing light energy. In this manner, light energy that impinges on the reflective layer is reflected away from the light detector 200, instead of being absorbed into the light detector 200 (absorbed light energy of sufficient intensity could otherwise damage the light detector 100).

The mirror 204 may be secured in a fixed position on the top surface 216. One or more supports 220 (such as brackets, posts, tracks, rails, or the like) may connect to lateral edges 222 of a frame 224 that supports a reflecting surface 226, such as a polished mirrored surface. As shown, the mirror 204 is supported at a unique position that is angled with respect to a central longitudinal axis 228, a central lateral axis 230, and a central depth axis 232 of the substrate 202. The axes 228, 230, and 232 are orthogonal to one another. The central longitudinal axis 228 is parallel to an X axis, while the central lateral axis 230 is parallel to a Y axis, and the central depth axis 232 is parallel to a Z axis.

The mirror 204 is angled at a unique combination of angles in relation to the axes 228, 230, and 232. When used with a plurality of light detectors each having fixed mirrors, the unique combination of angles may be different for each mirror.

Figure 3:
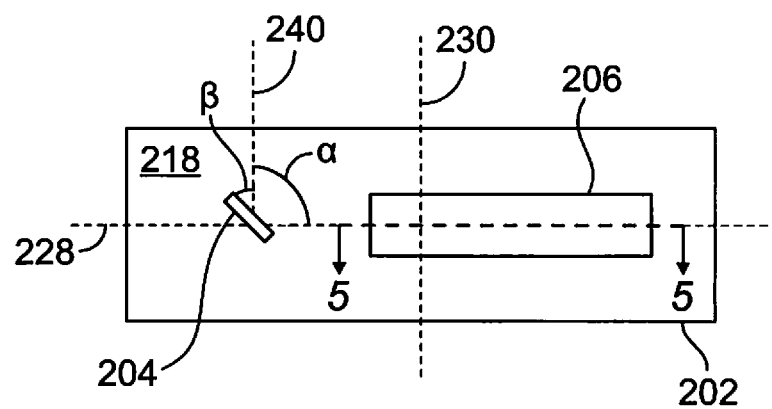
FIG. 3 illustrates a simplified top plan view of a light detector, according to an embodiment of the present disclosure.

FIG. 3 illustrates a simplified top plan view of the light detector 200. As shown, the mirror 202 may be set at an angle α with respect to the central longitudinal axis 228 (or a plane parallel to the central longitudinal axis 228), and an angle β with respect to a plane 240 that is parallel to the central lateral axis 230.

Figure 4:
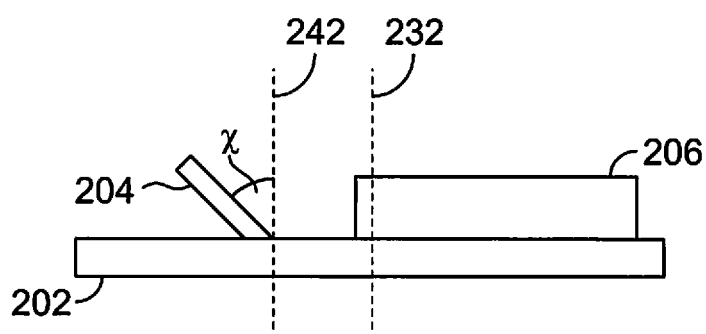
FIG. 4 illustrates a simplified lateral view of a light detector, according to an embodiment of the present disclosure.

FIG. 4 illustrates a simplified lateral view of the light detector 200. The mirror 204 may be set at an angle χ with respect to a plane 242 that is parallel to the central depth axis 232. Referring to FIGS. 3 and 4, the unique combination of angles is a combination of the angles α, β, and χ. In a system in which a plurality of light detectors 200 are used, each having a fixed mirror, each mirror is set at a unique combination of the angles α, β, and χ. While any two of the plurality of light detectors 200 may have two common angles, the third angle differs between the two light detectors 200. For example, two mirrors may have the same angles with respect to α and β, but different angles with respect to χ. As another example, two mirrors have the same angles with respect to α and χ, but different angles with respect to β, and so on. In this manner, each of the plurality of light detectors 200 includes a mirror 204 that may be set at a unique position to receive light from a light source and reflect the light energy into the light-receiving tube 206. A light detector assembly may include a total number of light detectors to cover a desired range of coverage that extends from a face of the light detector assembly. In at least one embodiment, the range of coverage may be represented by a cone, hemisphere, block, or other such shape that extends outwardly from a face of the light detector assembly.

Referring again to FIG. 2, light energy 250 is emitted from a light source 252 at a particular position 254. The light energy 250 impinges on the reflecting surface 226 of the mirror 204 along a line of incidence 260 and reflects toward the light-receiving tube 206 at an angle of reflectance θ along a line of reflectance 262. The light energy 250 reflects into a light-transmissive opening 270 at an end 272 of the light-receiving tube 206 along the line of reflectance 262 toward a sensor 280 at an opposite end 282 of the light-receiving tube 206, wherein the reflected light energy along the line of reflectance substantially aligns with a central light path. The sensor 280 may be a device that is configured to detect light, such as a photodiode, phototransistor, or the like. As noted above, a control unit, such as the control unit 104 of FIG. 1, is in communication with the sensor 280.

Figure 5:
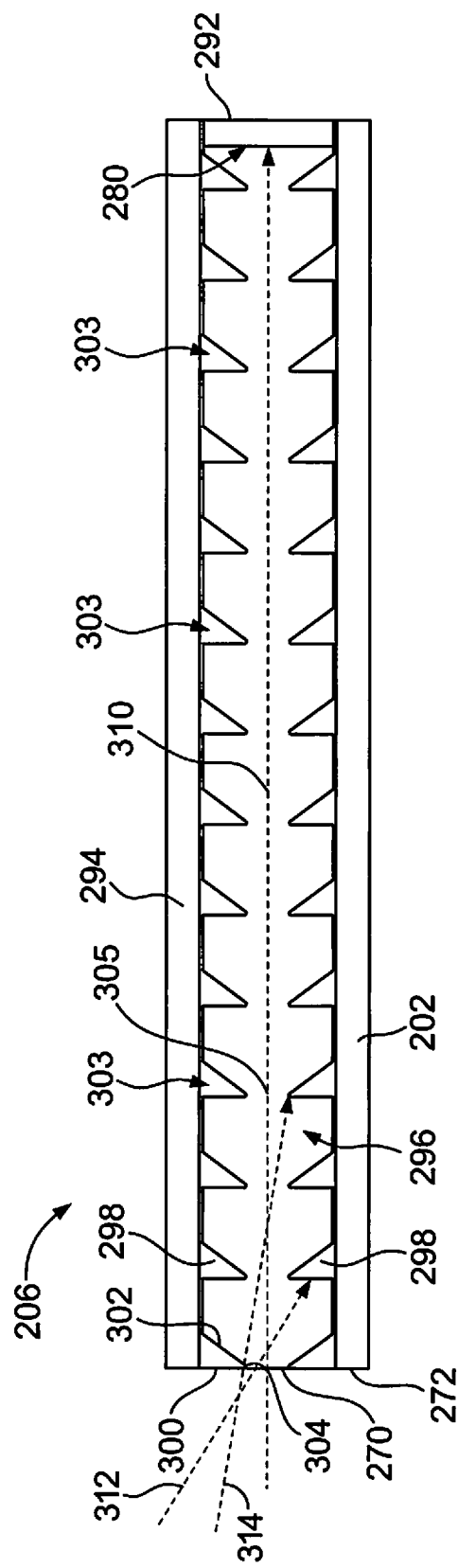
FIG. 5 illustrates a cross-sectional view of a light-receiving tube through line 5-5 of FIG. 3, according to an embodiment of the present disclosure.

FIG. 5 illustrates a cross-sectional view of the light-receiving tube 206 through line 5-5 of FIG. 3, according to an embodiment of the present disclosure. Referring to FIGS. 2 and 5, the light-receiving tube 206 may include lateral walls 290 connected to an end wall 292 at the end 282. The sensor 280 may be secured to, or otherwise form, the end wall 292. The light-transmissive opening 270 at the end 272 may be an open space, or may include a clear, light-transmissive cover, such as formed of clear plastic, glass, and/or the like. The lateral walls 290 and the end wall 292 connect to an upper wall 294, which may be formed of a reflective layer, such as a mirror, aluminized sheet, and/or the like, similar to the top surface 216 of the substrate 202.

The reflective layers of the upper wall 294 and the top surface 216 reflect (instead of absorbing) light energy. Accordingly, light energy reflects off the exposed surfaces (for example, the surfaces exposed to an external environment) of the light detector 200, instead of being absorbed thereby. For example, without the reflective surfaces, light energy of sufficient magnitude could damage the light detector 200, such as by welding components together or melting components. Alternatively, exposed surfaces of the light detector 200 may not include reflective surfaces.

The lateral walls 290, the end wall 292, the upper wall 294, and an upper surface of the substrate 202 define a light chamber 296 within the light-receiving tube 206. The light chamber 296 may be filled with air or glass, for example, so as to allow light to pass therethrough. Partitions 298 may extend into the light chamber 296 from internal surfaces of the lateral walls 290, the end wall 292, the upper wall 294, and the upper surface of the substrate 202. Each partition 298 may include a front surface 300 that may be parallel to the end wall 292, and a rear angled surface 302 that recedes away from an apex 304 towards an internal surface. Each partition 298 may be formed of a material that blocks light transmission. For example, each partition 298 may be formed of silicon. Alternatively, each partition 298 may be formed of a metal, opaque plastic, or the like. More or less partitions 298 than shown may be used.

The rear angled surface 302 may be oriented at an angle that prevents light within the light-receiving tube from reflecting back out of the light-transmissive opening 270. For example, light energy that impinges upon the rear angled surface 302 may be blocked by the rear angled surface 302, or internally reflected within the light-receiving tube with passing toward the light-transmissive opening 270.

As shown, vertically aligned partitions 298 may cooperate to form a light barrier 303 having an opening 305 formed therethrough. The opening 305 may be aligned with a central light path. The openings 305 may be spaced apart from and linearly aligned with one another. The linearly aligned openings 305 extending from the light-transmissive opening 270 to the sensor 280 may define a central light path that extends to the sensor 280.

In operation, as light is reflected off the mirror 204 toward the light-receiving tube 206, the light passes into the light-transmissive opening 270. In order to impinge upon the sensor 280, the light passes through the light-transmissive opening 270 along a line of reflectance that is substantially parallel to and centered about the central light path 310 that extends through the light-receiving tube 206 unobstructed by the partitions 298.

As shown, if light energy passes into the light-transmissive opening 270 along lines of reflectance 312, 314 that are not parallel to and centered about the central light path 310, the light energy impinges upon at least one partition 298, and is thereby blocked from reaching the sensor 280.

If, however, the light energy passes into the transmissive opening 270 along a line of reflectance that is substantially parallel to and centered about the central light path 310, the light energy impinges upon the sensor 280. In response to light energy impinging thereupon, the sensor 280 outputs a signal that is detected by the control unit 104 (shown in FIG. 1). The control unit 104 then detects a direction from which the light energy is originating by analyzing the line of reflectance and the line of incidence. For example, by tracing the line of reflectance back to the mirror 204, the control unit 104, knowing the unique position of the mirror 204, determines the angle of reflectance θ, and then traces the line of incidence therefrom, which provides the direction from which the light energy is being emitted.

In at least one embodiment, each mirror 204 may be associated with a unique direction of emitted light energy. Thus, as the sensor 280 outputs a light detection signal, the control unit 104 immediately determines that light energy is being emitted from a predetermined location relative to, and associated with, the light detector 200. The predetermined location may be stored in a memory that is operatively connected to, and/or part of, the control unit 104.

The partitions 298 may be sized, shaped, and positioned so as to prevent light energy from within the light-receiving tube 206 from being reflected back out through the light-transmissive opening 270. For example light within the light-receiving tube 206 that impinges upon the ramped, rear angled surfaces 302 may be contained within the light-receiving tube, as the angle of the surfaces 302 ensures that the light reflects or bounces within the light-receiving tube 206. Alternatively, each partition 298 may be sized, shaped, and positioned in a different manner than shown. For example, each partition 298 may be shaped as a semispherical protuberance, a block, a post, or the like.

In at least one embodiment, the sensor 280 may include or be operatively connected to a camera that is activates to record an image associated with a light source when the sensor 280 detects light energy, for example. The camera may be a nano-sized camera, for example, that is secured to the sensor 280, for example. In at least one embodiment, the sensor 280 may include a light detector and camera on a chip.

Embodiments of the present disclosure provide accurate detection of a direction of emitted light (or a position of an original of light energy). For example, an angular accuracy of a light detector may be determined by a diameter of a mirror/length of the light-receiving tube, the quotient of which may be divided by the square root of 12. In at least one embodiment, the diameter of the mirror may be 0.25 microns, while the length of the light-receiving tube may be 50 microns. In such an embodiment, the angular accuracy is approximately 1.5 milliradians. Such milliradian-scale accuracy may be achieved with detector assembly sizes that scale to large coverage in a larger semiconductor substrate. For example, the diameter of the mirror may be 2 microns, and the length of the light-receiving tube may be 400 microns. It is to be understood, however, that the dimensions of the light detecting assembly may be greater or lesser than indicated.

Figure 6:
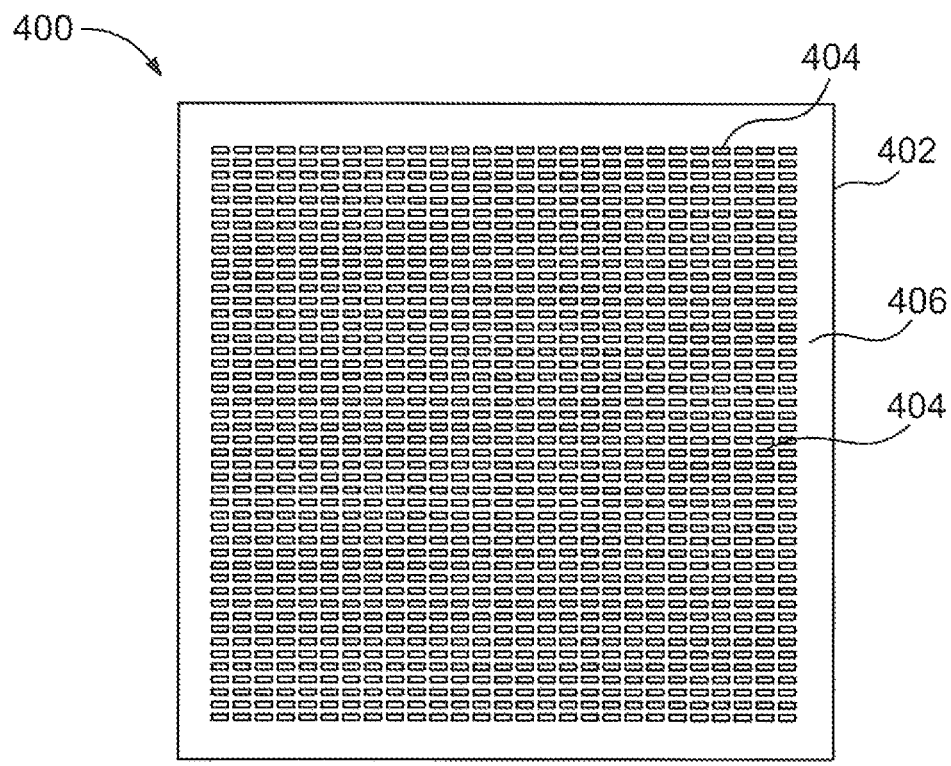
FIG. 6 illustrates a front view of a light detecting assembly, according to an embodiment of the present disclosure.

FIG. 6 illustrates a front view of a light detecting assembly 400, according to an embodiment of the present disclosure. The light detecting assembly 400 includes a base 402 that supports a plurality of light detectors 404, such as any of those described in the present application. The base 402 may be a single substrate for example that supports the plurality of light detectors 404. Thus, each of the light detectors 404 may share a common substrate. Optionally, the base 402 may support separate and distinct substrates for each of the light detectors 404.

Each of the light detectors 404 may include a mirror and a light-receiving tube. Each mirror may be fixed at a unique position, which may be a unique combination of angles, as described above. The light detectors 404 may cooperate to cover a volume of space or range that extends outwardly from the face 406 of the base 402 as a cone, hemisphere, or the like.

As shown, the light detectors 404 may be positioned in an array that is rectangular or square in shape. Alternatively, the light detectors 404 may be positioned in an array having various other shapes and sizes.

Figure 7:
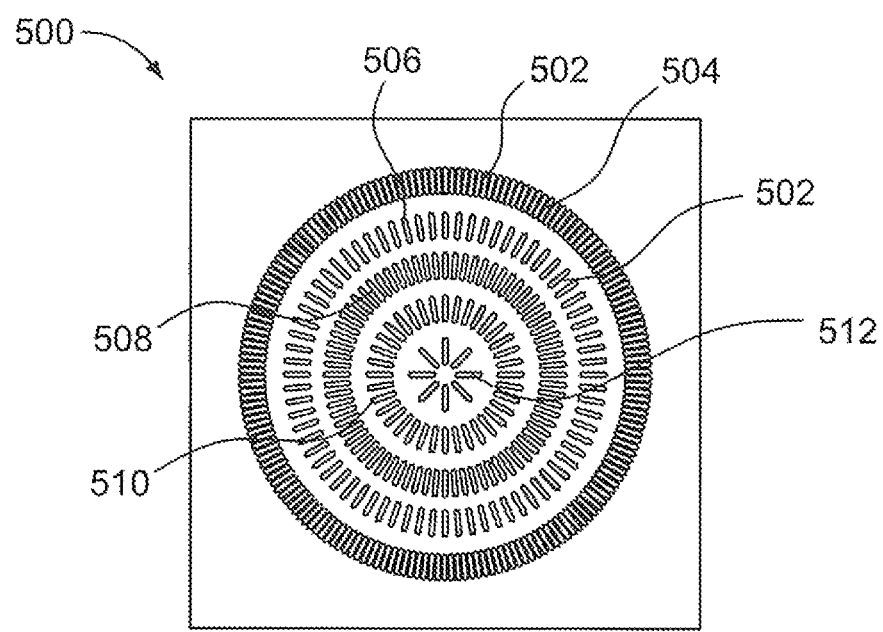
FIG. 7 illustrates a front view of a light detecting assembly, according to an embodiment of the present disclosure.

FIG. 7 illustrates a front view of a light detecting assembly 500, according to an embodiment of the present disclosure. The light detecting assembly 500 is similar to the light detecting assembly 500, except that light detectors 502 are arranged in concentric circular patterns 504, 506, 508, 510, and 512. More or less circular patterns than shown may be used.

Figure 8:
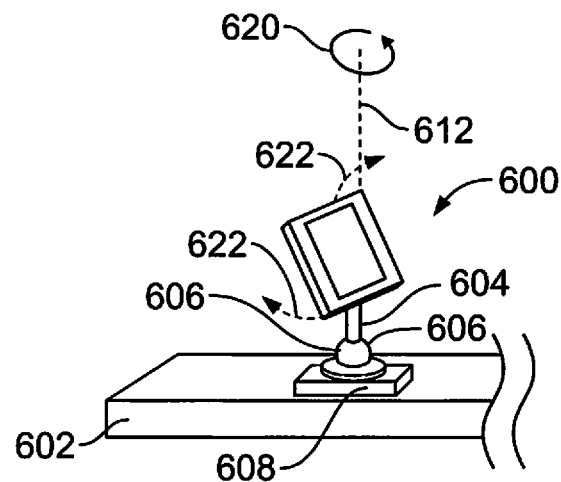
FIG. 8 illustrates a perspective top view of a mirror supported on a substrate, according to an embodiment of the present disclosure.

FIG. 8 illustrates a perspective top view of a mirror 600 supported on a substrate 602, according to an embodiment of the present disclosure. The mirror 600 is similar to those described above, except that the mirror 600 is not set in a fixed position with respect to the substrate 602. Instead, the mirror 600 may be operatively coupled to a yoke 604 that connects to one or more hinges 606 that connect to one or more actuators 608. In this manner, the mirror 600 may be configured as a MEMS device. As such, the actuator(s) 608 may move the mirror 600 through one or more ranges of motion. For example, the actuator(s) 608 may rotate the mirror 600 about a vertical axis 612 in the direction of arc 620. Similarly, the actuator(s) 608 may pivot the mirror in relation to the vertical axis 612 in the directions of arcs 622.

The control unit 104 (shown in FIG. 1) may control and/or monitor movement of the mirror 600 over time. Movement of the mirror 600 allows the mirror to cover a wider range of space as compared to a fixed mirror. The mirror 600 may be configured to move in the directions of arc 620 over a range 360 degrees, and in the directions of arcs 622 over a range of 180 degrees. Optionally, the mirror 600 may be configured to move over greater or lesser ranges.

A light detecting assembly may include a single light detector having the moveable mirror 600. Alternatively, the light detecting assembly may include additional light detectors having moveable mirrors 600. In short, because the mirrors 600 are moveable, the light detector assembly may not need as many light detectors as those having fixed mirrors, as the moveable mirrors are able to cover a wider range of space.

Figure 9:
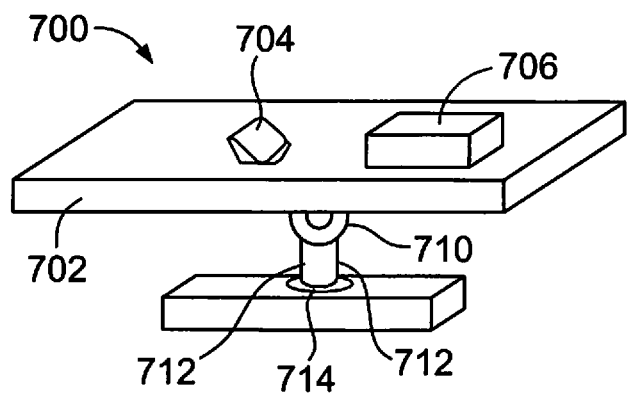
FIG. 9 illustrates a perspective top view of a light detector, according to an embodiment of the present disclosure.

FIG. 9 illustrates a perspective top view of a light detector 700, according to an embodiment of the present disclosure. The light detector 700 is similar to the light detector 200 shown in FIG. 2. For example, the light detector 700 includes a substrate 702 that supports a fixed mirror 704 and a light-receiving tube 706. The substrate 702 is operatively connected to a yoke 710, which, in turn, is connected to one or more support hinges 712. One or more actuators 714 are operatively connected to the hinge 712. The actuator(s) 714 may be supported by a base 716. The actuator(s) 714 operate to move the light detector 700 through various positions, in a similar manner as described with respect to FIG. 8.

Figure 10:
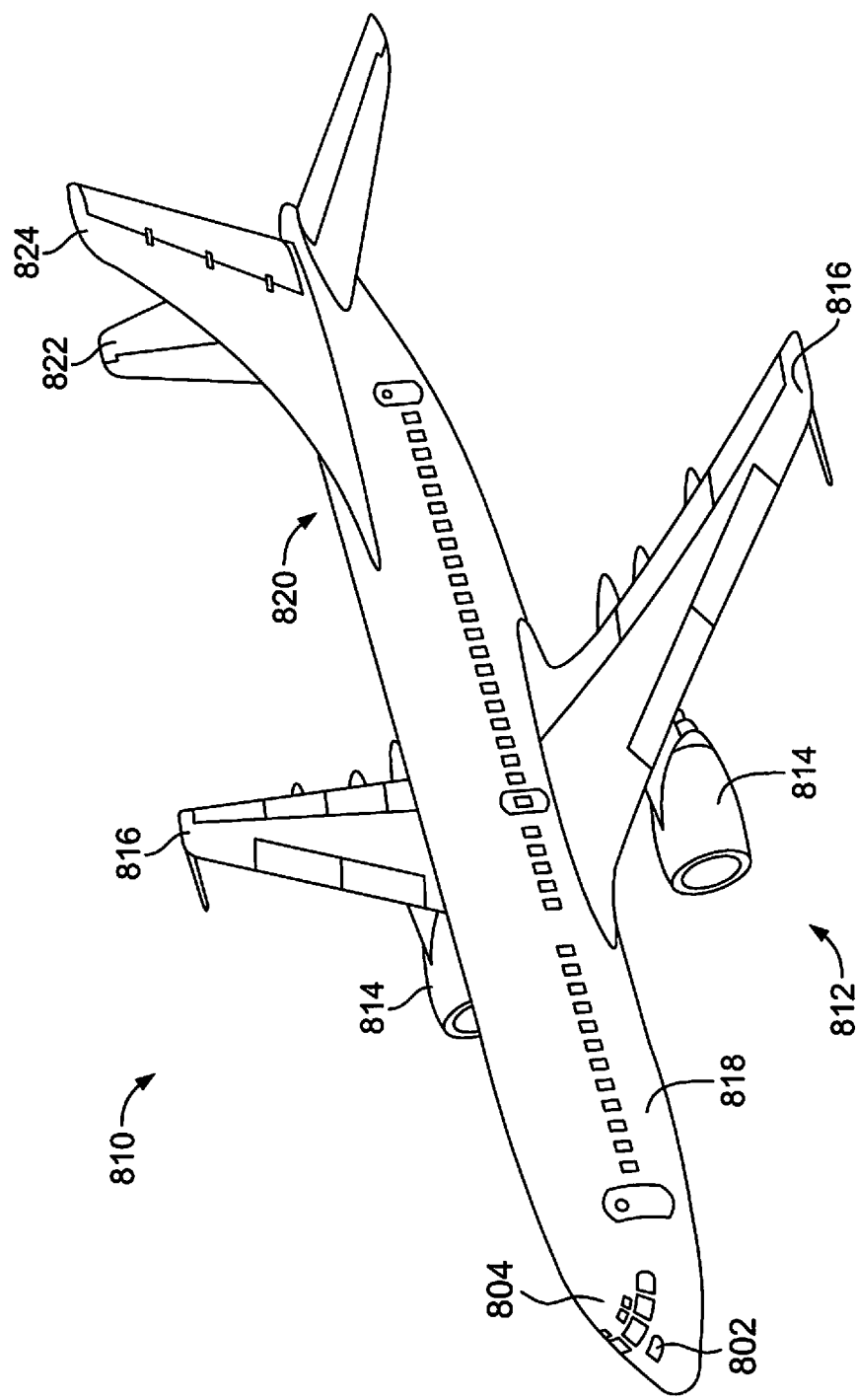
FIG. 10 illustrates a perspective top view of an aircraft, according to an embodiment of the present disclosure.

FIG. 10 illustrates a perspective top view of an aircraft 810 (or aircraft assembly), according to an embodiment of the present disclosure. The aircraft 810 is an example of a vehicle that may include one or more light detection systems 802, such as any of those described above. Alternatively, instead of an aircraft, the systems and methods of embodiments of the present disclosure may be used with various other vehicles, such as automobiles, buses, locomotives and train cars, seacraft, spacecraft, and the like.

The aircraft 810 may include a propulsion system 812 that may include two turbofan engines 814, for example. Optionally, the propulsion system 812 may include more engines 814 than shown. The engines 814 are carried by wings 816 of the aircraft 810. In other embodiments, the engines 814 may be carried by a fuselage 818 and/or an empennage 820. The empennage 820 may also support horizontal stabilizers 822 and a vertical stabilizer 824.

The light detection system 802 may be positioned proximate to the cockpit 804. The light detection system 802 may include one or more light detectors operatively coupled to a control unit, as described above. The control unit may be positioned within the cockpit 804, for example. Alternatively, the light detection system 802 may be positioned at various other locations. Also, alternatively, the aircraft 810 may include additional light detection systems 802 at various locations.

Figure 11:
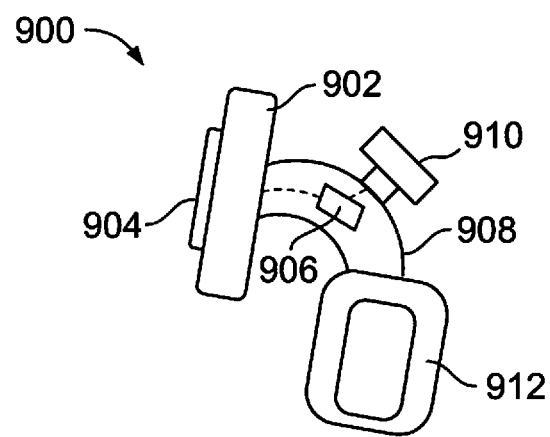
FIG. 11 illustrates a lateral view of a handheld light detection system, according to an embodiment of the present disclosure.

FIG. 11 illustrates a lateral view of a handheld light detection system 900, according to an embodiment of the present disclosure. The light detection system 900 may include a base 902 that supports a light detection assembly 904, such as any of those described above, that is operatively coupled to a control unit 906, which may be secured within a housing 908 connected to the base 902. The control unit 906 may also be operatively coupled to a monitor 910, such as a light-emitting diode (LED) display, a digital display, and/or the like. The housing 908 connects to a handle 912, which may be grasped by an individual. As such, the light detection system 900 may be carried by individuals and used on battlefields, for example.

Figure 12:
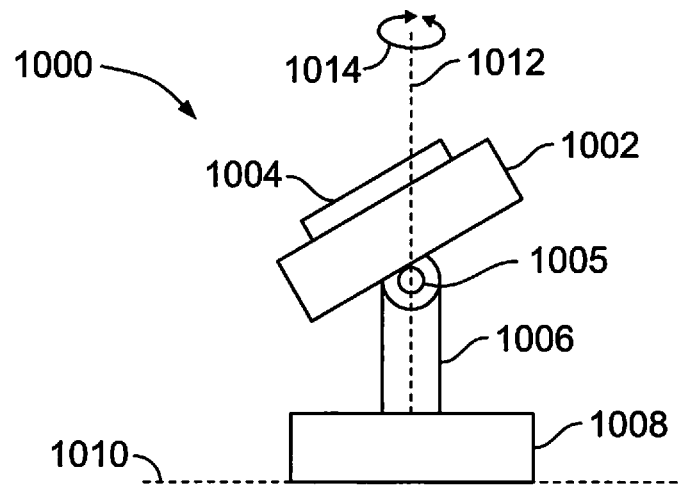
FIG. 12 illustrates a lateral view of a light detection system, according to an embodiment of the present disclosure.

FIG. 12 illustrates a lateral view of a light detection system 1000, according to an embodiment of the present disclosure. The light detection system 1000 may include a base 1002 that supports a light detection assembly 1004, such as any of those described above, that is operatively coupled to a control unit (not shown in FIG. 12). The base 1002 connects to a pivot support 1005 that connects to a rotatable column 1006. An anchoring structure 1008 secures the light detection system 1000 to a particular location 1010. The pivot support 1005 is configured to allow the light detection assembly 1004 to be pivoted up and down, while the column 1006 is configured to rotate the light detection assembly 1004 about a central axis 1012 in the directions of arc 1014. In this manner, the light detection system 1000 may be similar to a fixed radar station.

Figure 13:
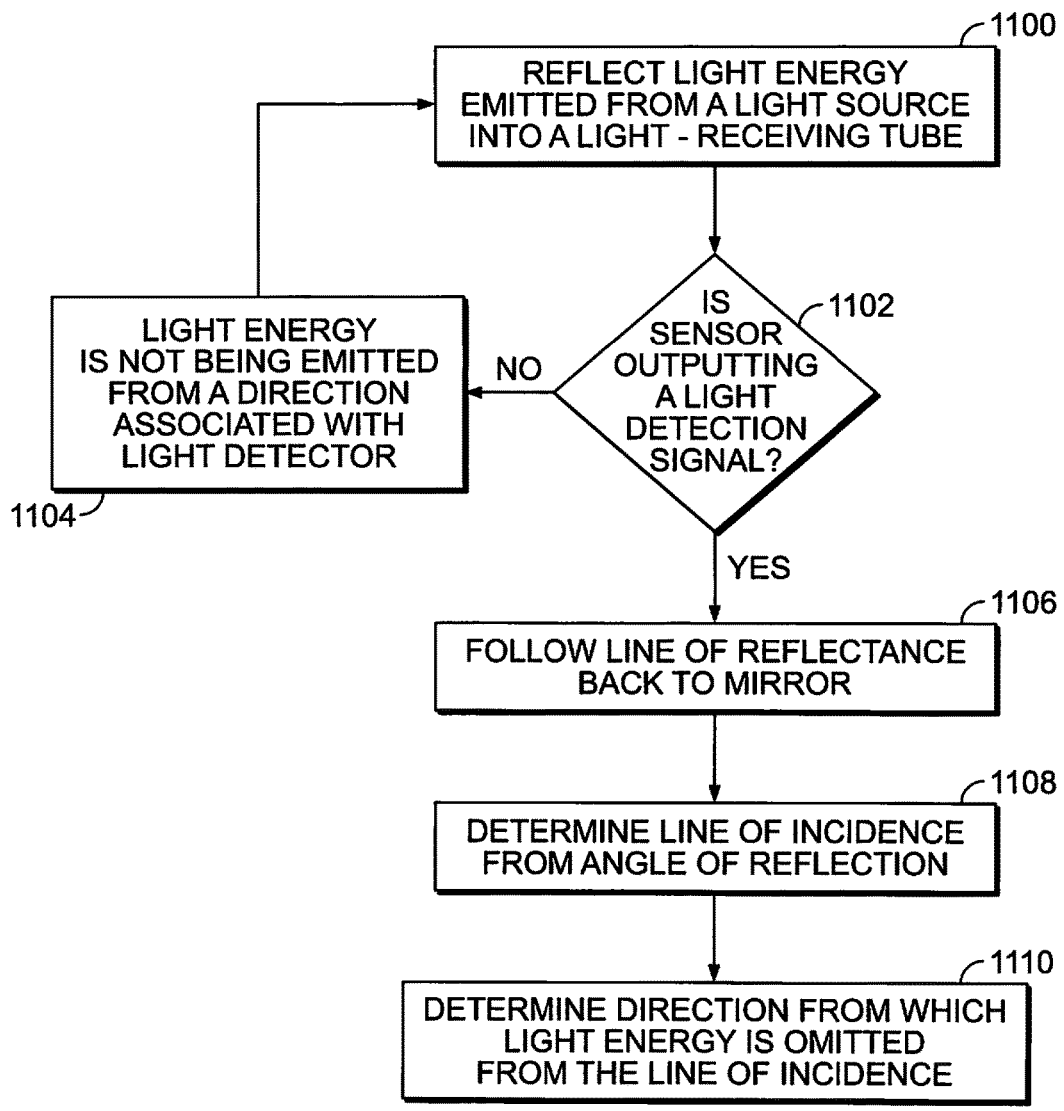
FIG. 13 illustrates a flow chart of a method of determining direction of origin of light energy, according to an embodiment of the present disclosure.

FIG. 13 illustrates a flow chart of a method of determining direction of origin of light energy, according to an embodiment of the present disclosure. The control unit 104 (shown in FIG. 1) may operate according to certain aspects of the flow chart of FIG. 13, for example.

At 1100, light energy emitted from a light source is reflected from a mirror into a light-receiving tube. At 1102, it is determined if a sensor at the end of the light-receiving tube is outputting a detection signal. If not, the method proceeds to 1104, in which it is determined that the light energy is not emitted or originating from a direction associated with the light detector. The method than returns to 1100.

If, however, the sensor is outputting a light detection signal, the method proceeds from 1102 to 1106, in which a line of reflectance extending from the sensor to the mirror is followed from the sensor to the mirror. Then, at 1108, a line of incidence is determined from an angle of reflectance, which may be based on knowledge of the unique position of the mirror. For example, the control unit may store the position of the mirror in memory. By following the line of reflectance back to the mirror, the control unit may then determine the angle of reflectance as it is a function of the unique angular position of the mirror. Consequently, at 1110, the line of incidence may be determined based on the angle of reflectance, and a direction from which the light energy is emitted may be determined through a determination of the line of incidence.

Additionally, a location of the light source may also be determined. For example, the light detection system may be positioned at a first location and detect the direction of light being emitted from the light source. As the system is moved to a second, different location, the direction of light may be detected from the different location. The control unit may determine an actual location of the light source by determining an intersection of the line of incidence determined from the first location and the line of incidence determined from the second location. As such, as the light detection system moves, the actual position of the light source may be geo-located.

The control unit 104 of FIG. 1 may determine a direction of light emitted from a light source by receiving a light detection signal from a light detector of the light detecting assembly, determining an angle of reflectance with respect to the mirror of the light detector, and determining a line of incidence from the angle of reflectance. Additionally, the control unit 104 may determine a position of the light source by detecting the direction of light energy from a first detecting position (for example, a first position of the light detector assembly) and a second detecting position that differs from the first detecting position. Further, the control unit 104 may determine an intensity of light emitted from the light source based on an energy level detected by the sensor. For example, light that impinges upon the sensor generates energy on or in the sensor. The control unit may determine the intensity level of the light through detection of the energy.

Referring to FIGS. 1-13, the sensors of the light detection systems may also be configured to detect light intensity, wavelengths, and/or the like. For example, each sensor may be configured to detect light at a particular wavelength. In at least one embodiment, one set of light detectors may be configured to detect infrared light, another set may be configured to detect visible light, while another set may be configured to detect ultraviolet light.

In at least one embodiment, each sensor may be configured to detect light at a particular energy level. For example, if a system is configured to detect weapons grade laser light energy, each sensor may be configured to output a light detection signal when light energy above a particular threshold is reached. If the threshold is not met, the sensor may not output the signal. Optionally, the control unit may be configured to disregard light detection signals below a particular threshold.

As explained above, embodiments of the present disclosure provide efficient light detection systems. Also, embodiments of the present disclosure are less costly than prior devices, as they may include less components. For example, embodiments of the present disclosure may be devoid of lenses. Further, embodiments of the present disclosure provide light detecting assemblies that are more compact than prior devices. For example, because lenses may not be used, assemblies may be more compact as there may be no need to space one or more lenses from a sensor. Further, the light detection assemblies may include reflective surfaces that reflect light energy, instead of absorbing the light energy, thereby providing durable assemblies.

Embodiments of the present disclosure provide systems that are configured to determine a direction of light emitted by a light source. Embodiments of the present disclosure provide systems and assemblies that may be contained in a relatively small housing. Further, embodiments of the present disclosure provide systems that accurately detect a direction of emitted light (that is, the direction from which the light is emitted).

While various spatial and directional terms, such as top, bottom, lower, mid, lateral, horizontal, vertical, front and the like may be used to describe embodiments of the present disclosure, it is understood that such terms are merely used with respect to the orientations shown in the drawings. The orientations may be inverted, rotated, or otherwise changed, such that an upper portion is a lower portion, and vice versa, horizontal becomes vertical, and the like.

As used herein, a structure, limitation, or element that is "configured to" perform a task or operation is particularly structurally formed, constructed, or adapted in a manner corresponding to the task or operation. For purposes of clarity and the avoidance of doubt, an object that is merely capable of being modified to perform the task or operation is not "configured to" perform the task or operation as used herein.

It is to be understood that the above description is intended to be illustrative, and not restrictive. For example, the above-described embodiments (and/or aspects thereof) may be used in combination with each other. In addition, many modifications may be made to adapt a particular situation or material to the teachings of the various embodiments of the disclosure without departing from their scope. While the dimensions and types of materials described herein are intended to define the parameters of the various embodiments of the disclosure, the embodiments are by no means limiting and are exemplary embodiments. Many other embodiments will be apparent to those of skill in the art upon reviewing the above description. The scope of the various embodiments of the disclosure should, therefore, be determined with reference to the appended claims, along with the full scope of equivalents to which such claims are entitled. In the appended claims, the terms "including" and "in which" are used as the plain-English equivalents of the respective terms "comprising" and "wherein." Moreover, the terms "first," "second," and "third," etc. are used merely as labels, and are not intended to impose numerical requirements on their objects. Further, the limitations of the following claims are not written in means-plus-function format and are not intended to be interpreted based on 35 U.S.C. §112(f), unless and until such claim limitations expressly use the phrase "means for" followed by a statement of function void of further structure.

This written description uses examples to disclose the various embodiments of the disclosure, including the best mode, and also to enable any person skilled in the art to practice the various embodiments of the disclosure, including making and using any devices or systems and performing any incorporated methods. The patentable scope of the various embodiments of the disclosure is defined by the claims, and may include other examples that occur to those skilled in the art. Such other examples are intended to be within the scope of the claims if the examples have structural elements that do not differ from the literal language of the claims, or if the examples include equivalent structural elements with insubstantial differences from the literal language of the claims.

What is claimed is:

1. A light detecting assembly comprising:
   one or more light detectors, wherein each of the one or more light detectors includes:
      a substrate;
      a mirror coupled to the substrate; and
      a light-receiving tube coupled to the substrate, wherein the light-receiving tube includes: (a) a sensor positioned at a first end, (b) a light-transmissive opening at a second end that is opposite from the first end, and (c) a plurality of partitions that are configured to block transmission of light energy, wherein a central light path extends through the light-receiving tube in a manner such that only light energy reflected off the mirror that is substantially aligned with the central light path impinges on the sensor; and
   a controller that determines a reflective direction of the source of light energy based on the angle of reflectance of light off the mirror when the light energy impinges on the sensor.

2. The light detecting assembly of claim 1, wherein the one or more light detectors comprises a plurality of light detectors.

3. The light detecting assembly of claim 1, wherein the partitions do not extend into the central light path.

4. The light detecting assembly of claim 1, wherein the mirror is configured to reflect light from a light source into the light-transmissive opening.

5. The light detecting assembly of claim 1, wherein the mirror is positioned relative to a particular location, wherein the mirror is oriented at a unique angle that is configured to reflect light from a light source that is at the particular location through the central light path and onto the sensor.

6. The light detecting assembly of claim 5, wherein the light is reflected into at least one of the plurality of partitions when the light source is at a different location other than the particular location.

7. The light detecting assembly of claim 1, wherein each of the plurality of partitions is configured to prevent light that passes into the light-receiving tube from reflecting out of the light-receiving tube.

8. The light detecting assembly of claim 1, wherein the mirror is fixed in position relative to the substrate and the light-receiving tube.

9. The light detecting assembly of claim 1, wherein each of the one or more light detectors further comprises at least one actuator operatively coupled to the mirror, wherein the at least one actuator is configured to move the mirror relative to the substrate and the light-receiving tube.

10. A light detection system, comprising:
   a light detecting assembly including a plurality of light detectors, wherein each of the plurality of light detectors comprises:

a substrate;

a mirror coupled to the substrate; and a light-receiving tube coupled to the substrate, wherein the light-receiving tube includes: (a) a sensor positioned at a first end, (b) a light-transmissive opening at a second end that is opposite from the first end, and (c) a plurality of partitions that are configured to block transmission of light energy, wherein a central light path extends through the light-receiving tube in a manner such that only light energy reflected off the mirror that is substantially aligned with the central light path impinges on the sensor; and a control unit in communication with the light detecting assembly, wherein the control unit is configured to determine one or more of a direction of light emitted from a light source, a position of the light source, or an intensity of light emitted from the light source based on one or more light detection signals received from the light detecting assembly.

11. The light detection system of claim 10, wherein the control unit is configured to determine the direction of light energy by receiving the one or more light detection signals from the plurality of light detectors, determining at least one angle of reflectance with respect to the mirror, and determining at least one line of incidence from the at least one angle of reflectance.

12. The light detection system of claim 10, wherein the control unit is configured to determine the position of the light source by detecting the direction of light from the light source at a first detecting position and a second detecting position that differs from the first position.

13. The light detection system of claim 10, wherein each mirror of each of the plurality of light detectors is fixed at a unique angular combination with respect to three orthogonal axes.

14. The light detection system of claim 10, wherein the mirror is positioned relative to a particular location, wherein the mirror is oriented at a unique angle that is configured to reflect light from a light source that is at the particular location onto the sensor through the central light path, and wherein the light is reflected into at least one of the plurality of partitions when the light source is at a different location other than the particular location.

15. The light detection system of claim 10, wherein each of the plurality of partitions is configured to prevent light that passes into the light-receiving tube from reflecting out of the light-receiving tube.

16. The light detection system of claim 10, wherein the mirror is fixed in position relative to the substrate and the light-receiving tube.

17. The light detection system of claim 10, wherein each of the one or more light detectors further comprises at least one actuator operatively coupled to the mirror, wherein the at least one actuator is configure to move the mirror relative to the substrate and the light-receiving tube.

18. The light detection system of claim 10, wherein at least portions of the substrate and the light-receiving tube are covered with a reflective layer.

19. A light detection system, comprising:

a light detecting assembly including a plurality of light detectors, wherein each of the plurality of light detectors comprises:

a substrate;

a mirror coupled to the substrate, wherein each mirror of each of the plurality of light detectors is fixed at a unique angular combination with respect to three orthogonal axes;

a light-receiving tube coupled to the substrate, wherein the light-receiving tube includes: (a) a sensor positioned at a first end, (b) a light-transmissive opening at a second end that is opposite from the first end, and (c) a plurality of partitions that are configured to block transmission of light energy, wherein a central light path extends through the light-receiving tube in a manner such that only light energy reflected off the mirror that is substantially aligned with the central light path impinges on the sensor, wherein the mirror is positioned relative to a particular location, wherein the mirror is oriented at a unique angle that is configured to reflect light from a light source that is at the particular location onto the sensor through the central light path, and wherein the light is reflected into at least one of the plurality of partitions when the light source is at a different location other than the particular location;

one or more reflective layers covering at least portions of the substrate and the light-receiving tube; and a control unit in communication with the light detecting assembly, wherein the control unit is configured to determine:

a direction of light emitted from the light source by receiving one or more light detection signals from the light detecting assembly, determining at least one angle of reflectance with respect to the mirror, and determining at least one line of incidence from the at least one angle of reflectance;

a position of the light source by detecting the direction of light emitted from the light source at a first detecting position and a second detecting position that differs from the first detecting position; and an intensity of light emitted from the light source based on an energy level detected by the sensor.

* * * * *